(12) United States Patent
Fukumori et al.

(10) Patent No.: US 10,577,052 B2
(45) Date of Patent: Mar. 3, 2020

(54) BICYCLE CHAIN

(71) Applicant: SHIMANO INC., Sakai (JP)

(72) Inventors: Tsuyoshi Fukumori, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 175 days.

(21) Appl. No.: 15/719,576

(22) Filed: Sep. 29, 2017

(65) Prior Publication Data
US 2019/0100278 A1 Apr. 4, 2019

(51) Int. Cl.
*B62M 9/12* (2006.01)
*B62M 9/00* (2006.01)
*F16G 13/18* (2006.01)

(52) U.S. Cl.
CPC ............ *B62M 9/12* (2013.01); *F16G 13/18* (2013.01); *B62M 2009/005* (2013.01)

(58) Field of Classification Search
CPC .... B62M 2009/005; B62M 9/12; F16G 13/18
USPC ........................................................ 474/206
See application file for complete search history.

(56) References Cited

U.S. PATENT DOCUMENTS

| | | | |
|---|---|---|---|
| 5,465,568 A * | 11/1995 | Wang | B62M 9/10 474/206 |
| 6,364,799 B1 * | 4/2002 | Campagnolo | F16G 13/06 474/206 |
| 7,325,391 B1 * | 2/2008 | Oishi | F16G 13/06 59/5 |
| 7,946,941 B2 * | 5/2011 | Oishi | F16G 13/06 474/206 |
| 9,255,624 B2 * | 2/2016 | Fukumori | F16G 13/06 |
| 9,303,725 B2 * | 4/2016 | Fukumori | B62M 9/00 |
| 9,541,159 B2 * | 1/2017 | Wang | F16G 13/06 |
| 2005/0020394 A1 * | 1/2005 | Valle | B62M 9/00 474/155 |
| 2005/0202914 A1 * | 9/2005 | Reiter | F16G 13/06 474/206 |
| 2015/0094180 A1 * | 4/2015 | Fukumori | B62M 9/00 474/206 |

(Continued)

FOREIGN PATENT DOCUMENTS

| | | |
|---|---|---|
| CN | 101255901 | 9/2008 |
| CN | 205534019 U | 8/2016 |

(Continued)

*Primary Examiner* — Michael R Mansen
*Assistant Examiner* — Mark K Buse
(74) *Attorney, Agent, or Firm* — Mori & Ward, LLP

(57) ABSTRACT

A bicycle chain comprises a first outer link plate and a second outer link plate. A first outer-link longitudinal axis extends through a first outer-link center axis and a second outer-link center axis to divide a first outer surface into a first side and a second side when viewed in an axial direction. A second outer-link longitudinal axis extends through a third outer-link center axis and a fourth outer-link center axis to divide a second outer surface into a third side and a fourth side when viewed in the axial direction. The fourth side includes a first circumferential area and a first chamfer free area. The first circumferential area has a first angle equal to or larger than 20 degrees. The first chamfer free area is adjacent to the first circumferential area. At least one second chamfer is provided outside the first chamfer free area.

14 Claims, 13 Drawing Sheets

(56) References Cited

U.S. PATENT DOCUMENTS

| | | | | |
|---|---|---|---|---|
| 2015/0094181 A1* | 4/2015 | Fukumori | ................ | B62M 9/00 |
| | | | | 474/206 |
| 2015/0094182 A1* | 4/2015 | Fukumori | ............... | F16G 13/06 |
| | | | | 474/206 |
| 2015/0292597 A1* | 10/2015 | Fukumori | ............... | F16G 15/12 |
| | | | | 474/226 |
| 2015/0308542 A1* | 10/2015 | Fukumori | ................ | B62M 9/00 |
| | | | | 474/230 |
| 2017/0067535 A1 | 3/2017 | Fukumori et al. | | |
| 2019/0048973 A1* | 2/2019 | Fukumori | ............... | F16G 13/02 |
| 2019/0048974 A1* | 2/2019 | Fukumori | ............... | F16G 13/06 |
| 2019/0100278 A1* | 4/2019 | Fukumori | ................ | B62M 9/12 |

FOREIGN PATENT DOCUMENTS

| | | |
|---|---|---|
| CN | 106499772 | 3/2017 |
| DE | 202014005224 U1 | 11/2014 |

\* cited by examiner

BICYCLE CHAIN

BACKGROUND OF THE INVENTION

Field of the Invention

The present invention relates to a bicycle chain.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a chain.

SUMMARY OF THE INVENTION

In accordance with a first aspect of the present invention, a bicycle chain comprises a first outer link plate and a second outer link plate. The first outer link plate comprises a first outer surface, a first inner surface, a first outer-link end portion, a second outer-link end portion, at least one first chamfer, and a first outer-link longitudinal axis. The first inner surface is provided on a reverse side of the first outer surface in an axial direction. The first outer-link end portion includes a first outer-link center axis and a first outer-link outermost edge provided radially outward of the first outer-link center axis. The second outer-link end portion includes a second outer-link center axis and a second outer-link outermost edge provided radially outward of the second outer-link center axis. The at least one first chamfer is provided on the first outer surface. The first outer-link longitudinal axis extends through the first outer-link center axis and the second outer-link center axis to divide the first outer surface into a first side and a second side when viewed in the axial direction. The at least one first chamfer is provided on the first side and the second side. The second outer link plate comprises a second outer surface, a second inner surface, a third outer-link end portion, a fourth outer-link end portion, at least one second chamfer, and a second outer-link longitudinal axis. The second inner surface is provided on a reverse side of the second outer surface in the axial direction. The second inner surface faces toward the first inner surface in the axial direction. The third outer-link end portion includes a third outer-link center axis and a third outer-link outermost edge. The third outer-link center axis corresponds to the first outer-link center axis. The third outer-link outermost edge is provided radially outward of the third outer-link center axis. The fourth outer-link end portion includes a fourth outer-link center axis and a fourth outer-link outermost edge. The fourth outer-link center axis corresponds to the second outer-link center axis. The fourth outer-link outermost edge is provided radially outward of the fourth outer-link center axis. The at least one second chamfer is provided on the second outer surface. The second outer-link longitudinal axis extends through the third outer-link center axis and the fourth outer-link center axis to divide the second outer surface into a third side and a fourth side when viewed in the axial direction. The at least one second chamfer is provided on the third side. The fourth side includes a first circumferential area and a first chamfer free area. The first circumferential area is defined between the second outer-link longitudinal axis and a first radial reference line radially extending from the third outer-link center axis through a circumferential end of the at least one second chamfer. The first circumferential area has a first angle defined about the third outer-link center axis. The first angle is equal to or larger than 20 degrees. The first chamfer free area is adjacent to the first circumferential area. The at least one second chamfer is provided outside the first chamfer free area. The first circumferential area is provided between the second outer-link longitudinal axis and the first chamfer free area.

With the bicycle chain according to the first aspect, it is possible to make high shifting performance and noise reduction compatible with each other.

In accordance with a second aspect of the present invention, the bicycle chain according to the first aspect is configured so that the at least one second chamfer is positioned in the first circumferential area.

With the bicycle chain according to the second aspect, it is possible to certainly make high shifting performance and noise reduction compatible with each other.

In accordance with a third aspect of the present invention, the bicycle chain according to the first or second aspect is configured so that the first chamfer free area is defined between the first radial reference line and a second radial reference line radially extending from the third outer-link center axis. The first chamfer free area has a second angle defined about the third outer-link center axis. The first radial reference line is positioned between the second outer-link longitudinal axis and the second radial reference line in a circumferential direction with respect to the third outer-link center axis.

With the bicycle chain according to the third aspect, it is possible to certainly make high shifting performance and noise reduction compatible with each other.

In accordance with a fourth aspect of the present invention, the bicycle chain according to the third aspect is configured so that the second angle is equal to or larger than 53 degrees.

With the bicycle chain according to the fourth aspect, it is possible to certainly make high shifting performance and noise reduction compatible with each other.

In accordance with a fifth aspect of the present invention, the bicycle chain according to any one of the first to fourth aspects is configured so that the first side is overlapped with the third side when viewed in the axial direction. The second side is overlapped with the fourth side when viewed in the axial direction.

With the bicycle chain according to the fifth aspect, it is possible to certainly make high shifting performance and noise reduction compatible with each other.

In accordance with a sixth aspect of the present invention, the bicycle chain according to any one of the first to fifth aspects is configured so that the second outer link plate is positioned closer to a bicycle frame of a bicycle than the first outer link plate in a state where the bicycle chain is assembled to the bicycle.

With the bicycle chain according to the sixth aspect, it is possible to improve noise reduction with enabling an inward shifting operation in which the bicycle chain is shifted toward the bicycle frame.

In accordance with a seventh aspect of the present invention, the bicycle chain according to any one of the first to sixth aspects is configured so that the fourth side is positioned radially closer to a rotational center axis of a bicycle sprocket of a bicycle than the third side in a state where the bicycle chain is engaged with the bicycle sprocket.

With the bicycle chain according to the seventh aspect, it is possible to improve noise reduction with enabling an inward shifting operation in which the bicycle chain is shifted toward the bicycle frame.

In accordance with an eighth aspect of the present invention, a bicycle chain comprises a first outer link plate and a second outer link plate. The first outer link plate comprises a first outer surface, a first inner surface, and at least one first chamfer. The first inner surface is provided on a reverse side of the first outer surface in an axial direction. The at least one first chamfer is provided on the first outer surface. The second outer link plate comprises a second outer surface, a second inner surface, and at least one second chamfer. The second inner surface is provided on a reverse side of the second outer surface in the axial direction. The second inner surface faces toward the first inner surface in the axial direction. The at least one second chamfer is provided on the second outer surface. A total number of the at least one second chamfer is different from a total number of the at least one first chamfer.

With the bicycle chain according to the eighth aspect, it is possible to make high shifting performance and noise reduction compatible with each other.

In accordance with a ninth aspect of the present invention, the bicycle chain according to the eighth aspect is configured so that the total number of the at least one second chamfer is smaller than the total number of the at least one first chamfer.

With the bicycle chain according to the ninth aspect, it is possible to certainly make high shifting performance and noise reduction compatible with each other.

In accordance with a tenth aspect of the present invention, the bicycle chain according to the eighth or ninth aspect is configured so that the total number of the at least one second chamfer is a divisor of the total number of the at least one first chamfer.

With the bicycle chain according to the tenth aspect, it is possible to certainly make high shifting performance and noise reduction compatible with each other.

In accordance with an eleventh aspect of the present invention, the bicycle chain according to any one of the eighth to tenth aspects is configured so that at least one of the total number of the at least one first chamfer and the total number of the at least one second chamfer is a multiple of two.

With the bicycle chain according to the eleventh aspect, it is possible to certainly make high shifting performance and noise reduction compatible with each other.

In accordance with a twelfth aspect of the present invention, the bicycle chain according to any one of the eighth to eleventh aspects is configured so that the at least one first chamfer includes a plurality of first chamfers provided on the first outer surface. The at least one second chamfer includes a plurality of second chamfers provided on the second outer surface. A total number of the plurality of second chamfers is smaller than a total number of the plurality of first chamfers.

With the bicycle chain according to the twelfth aspect, it is possible to certainly make high shifting performance and noise reduction compatible with each other.

In accordance with a thirteenth aspect of the present invention, the bicycle chain according to the twelfth aspect is configured so that the second outer link plate comprises a second outer-link longitudinal axis defined when viewed in the axial direction. The at least one second chamfer is provided on the second outer-link longitudinal axis when viewed in the axial direction.

With the bicycle chain according to the thirteenth aspect, it is possible to certainly make high shifting performance and noise reduction compatible with each other.

In accordance with a fourteenth aspect of the present invention, the bicycle chain according to the twelfth or thirteenth aspect is configured so that the first outer link plate comprises a first outer-link longitudinal axis defined when viewed in the axial direction. The at least one first chamfer includes a plurality of first chamfers provided on the first outer surface. The first outer-link longitudinal axis is provided between one chamfer of the plurality of first chamfers and another chamfer of the plurality of first chamfers when viewed in the axial direction.

With the bicycle chain according to the fourteenth aspect, it is possible to certainly make high shifting performance and noise reduction compatible with each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
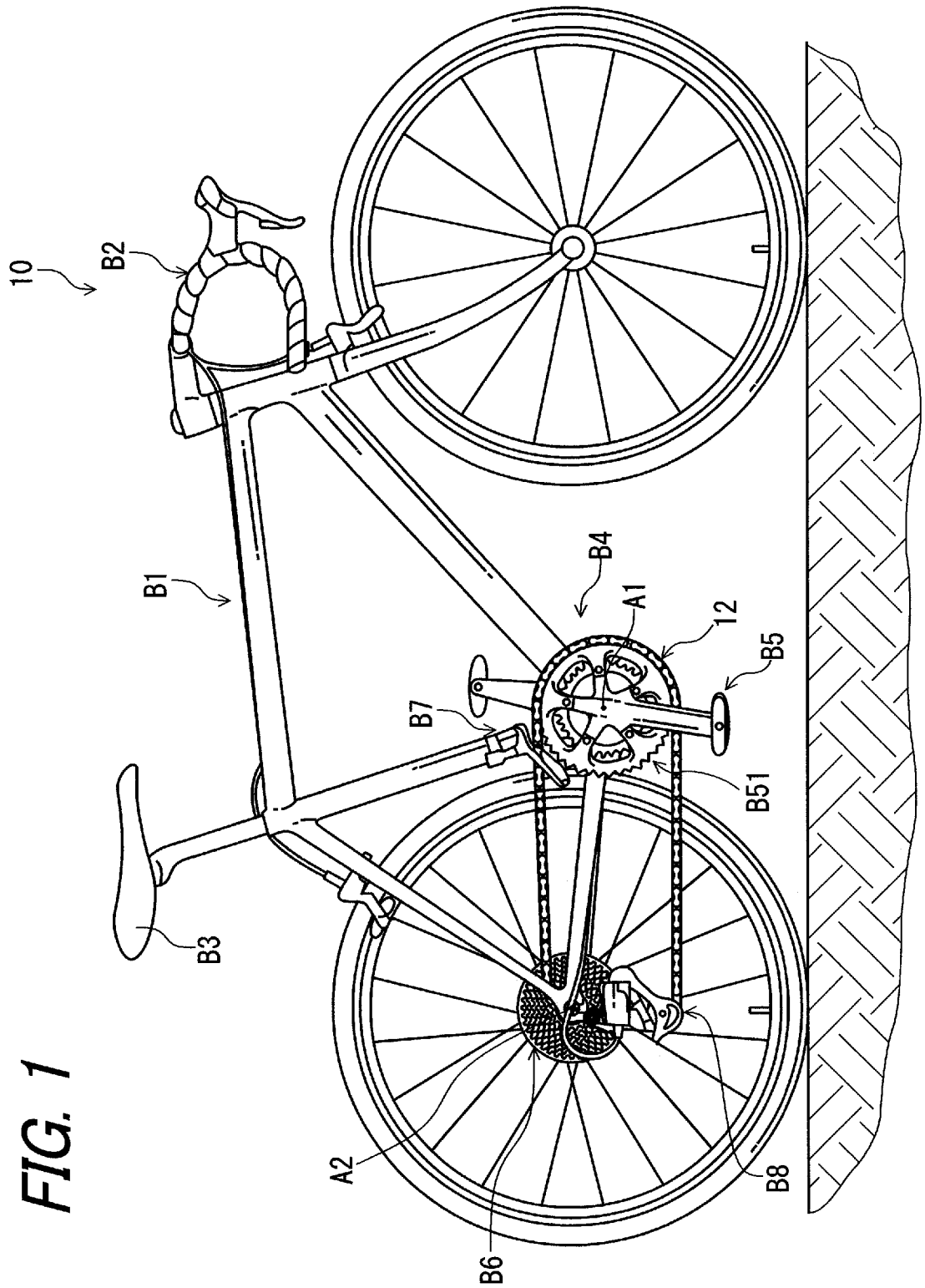
FIG. 1 is a side elevational view of a bicycle having a drive train that uses a bicycle chain in accordance with an embodiment.

The embodiment(s) will now be described with reference to the accompanying drawings, wherein like reference numerals designate corresponding or identical elements throughout the various drawings.

Referring initially to FIG. 1, a bicycle 10 is illustrated to be equipped with a bicycle chain 12 in accordance with an embodiment. The bicycle 10 includes a bicycle frame B1, a handlebar B2, a saddle B3, and a drive train B4. The drive train B4 is configured to convert the rider's pedaling force into driving force. The bicycle chain 12 is a part of the drive train B4. The drive train B4 also includes a bicycle crank assembly B5, a bicycle sprocket B6, a front derailleur B7, and a rear derailleur B8. The bicycle crank assembly B5 includes a bicycle sprocket B51. The bicycle crank assembly B5 is rotatably mounted on a bottom bracket of the bicycle frame B1 about a rotational center axis A1. The bicycle sprocket B6 is rotatably mounted to the bicycle frame B1 about a rotational center axis A2. The bicycle chain 12 is arranged on the bicycle sprocket B51 and the bicycle sprocket B6 so as to extend therebetween. The front derailleur B7 and the rear derailleur B8 are configured and arranged to change gears by shifting the bicycle chain 12 in a transverse direction of the bicycle 10. The bicycle sprocket B51 can also be referred to as a front sprocket B51. The bicycle sprocket B6 can also be referred to as a rear sprocket B6.

In the present application, the following directional terms "front," "rear," "forward," "rearward," "left," "right," "transverse," "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12, should be interpreted relative to the bicycle chain 12 as mounted on the bicycle 10 used in an upright riding position on a horizontal surface as illustrated in FIG. 1.

Figure 2:
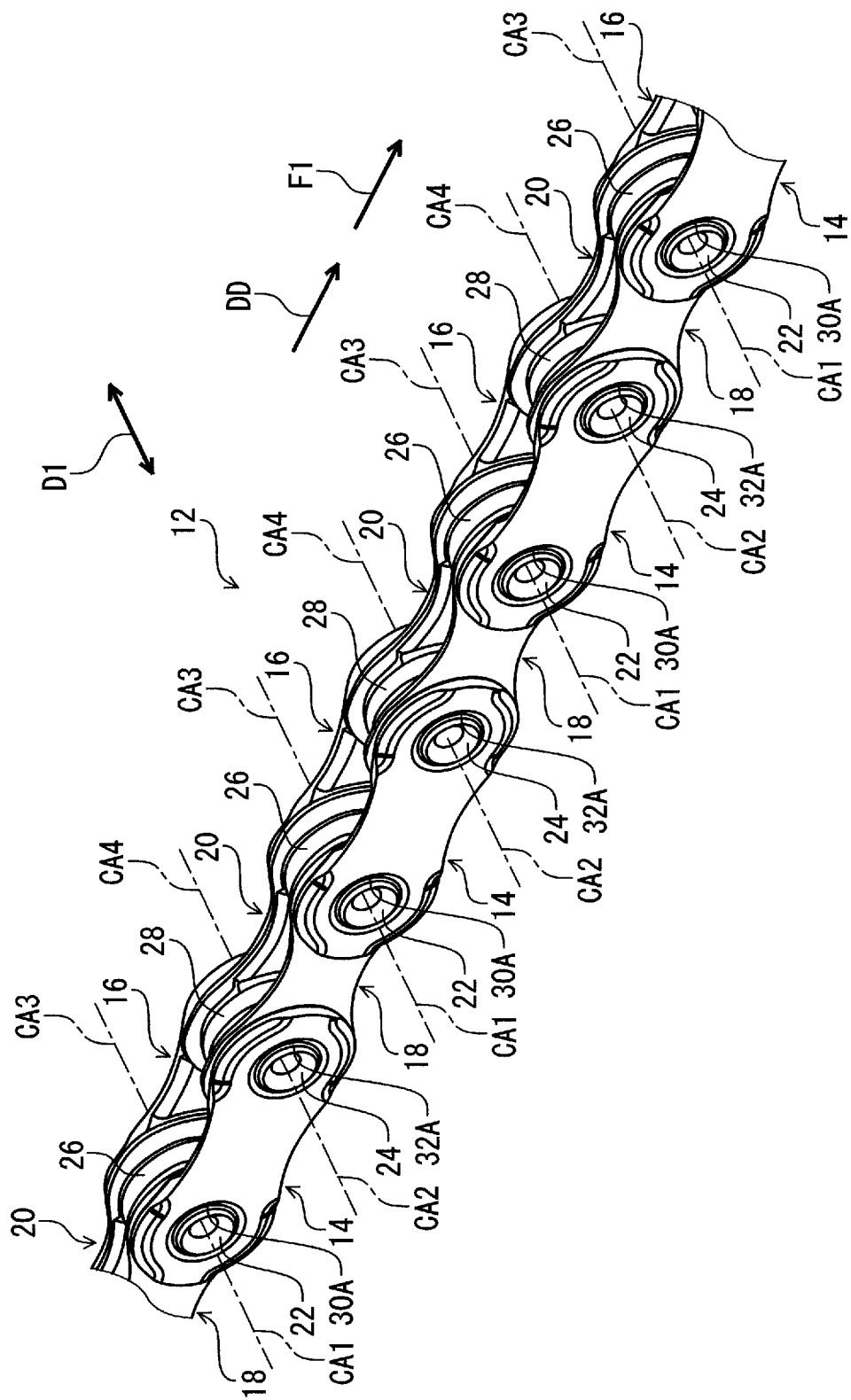
FIG. 2 is a partial perspective view of the bicycle chain illustrated in FIG. 1.
Figure 3:
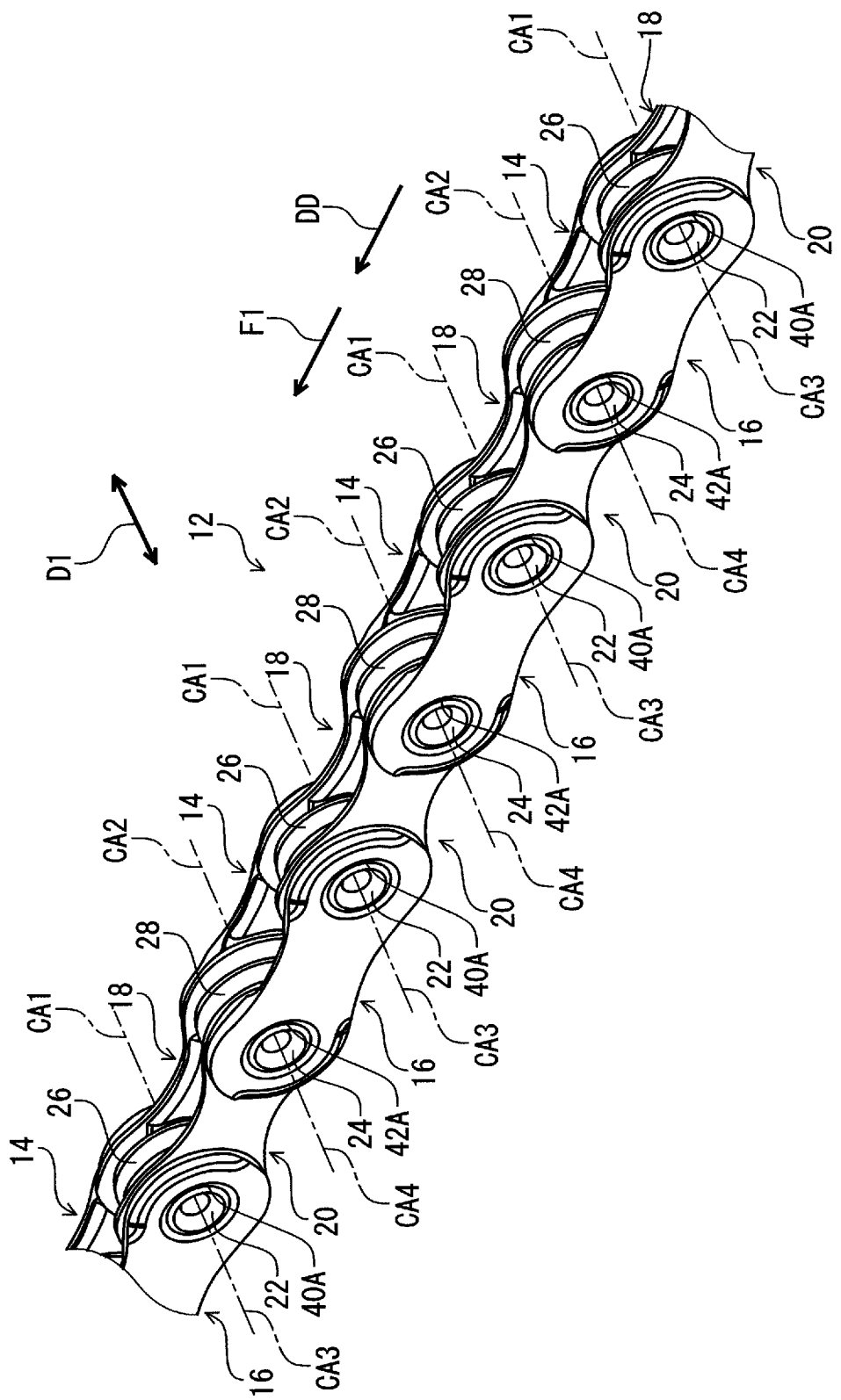
FIG. 3 is another partial perspective view of the bicycle chain illustrated in FIG. 1.

As seen in FIGS. 2 and 3, the bicycle chain 12 comprises a first outer link plate 14 and a second outer link plate 16. The bicycle chain 12 further comprises a first inner link plate 18, a second inner link plate 20, a first link pin 22, a second link pin 24, a first roller 26, and a second roller 28. In this embodiment, the bicycle chain 12 comprises a plurality of first outer link plates 14, a plurality of second outer link plates 16, a plurality of first link pins 22, a plurality of second link pins 24, a plurality of first rollers 26, and a plurality of second rollers 28. The bicycle chain 12 has a driving direction DD in which the bicycle chain 12 transmits a pedaling force F1 during pedaling.

Figure 4:
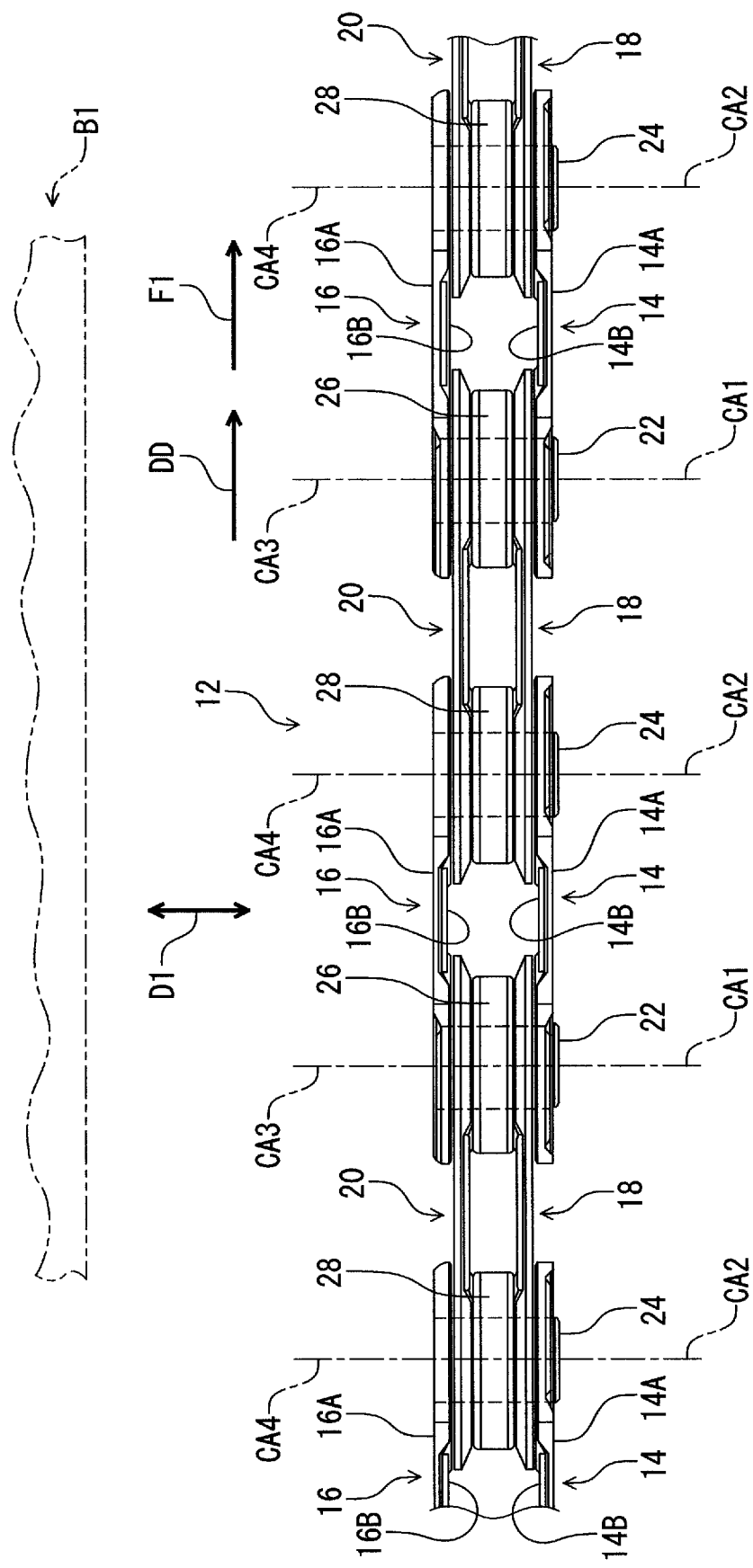
FIG. 4 is a partial plan view of the bicycle chain illustrated in FIG. 1.

As seen in FIG. 4, the first outer link plate 14 comprises a first outer surface 14A and a first inner surface 14B. The first inner surface 14B is provided on a reverse side of the first outer surface 14A in an axial direction D1. The second outer link plate 16 comprises a second outer surface 16A and a second inner surface 16B. The second inner surface 16B is provided on a reverse side of the second outer surface 16A in the axial direction D1. The second inner surface 16B faces toward the first inner surface 14B in the axial direction D1. The first inner link plate 18 and the second inner link plate 20 are provided between the first outer link plate 14 and the second outer link plate 16 in the axial direction D1. The first and second rollers 26 and 28 are provided between the first inner link plate 18 and the second inner link plate 20 in the axial direction D1.

In this embodiment, the second outer link plate 16 is positioned closer to the bicycle frame B1 of the bicycle 10 than the first outer link plate 14 in a state where the bicycle chain 12 is assembled to the bicycle 10. However, the first outer link plate 14 can be positioned closer to the bicycle frame B1 of the bicycle 10 than the second outer link plate 16 in the state where the bicycle chain 12 is assembled to the bicycle 10.

Figure 5:
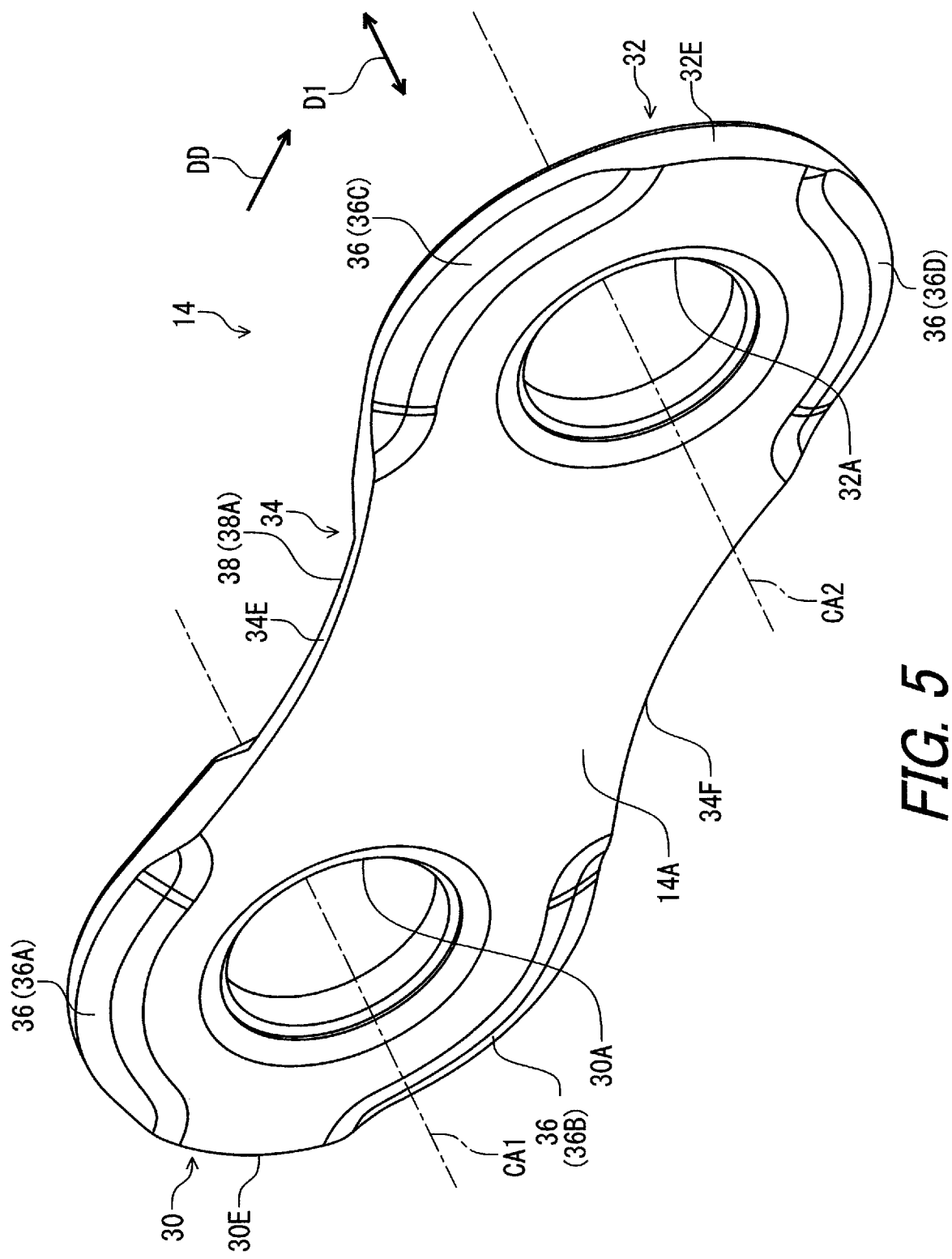
FIG. 5 is a perspective view of a first outer link plate of the bicycle chain illustrated in FIG. 1.

As seen in FIG. 5, the first outer link plate 14 comprises a first outer-link end portion 30 and a second outer-link end portion 32. The first outer link plate 14 comprises a first outer-link intermediate portion 34 provided between the first outer-link end portion 30 and the second outer-link end portion 32. The first outer-link intermediate portion 34 interconnects the first outer-link end portion 30 and the second outer-link end portion 32.

The first outer-link end portion 30 includes a first outer-link center axis CA1 and a first outer-link outermost edge 30E. The first outer-link outermost edge 30E is provided radially outward of the first outer-link center axis CA1. In this embodiment, the first outer-link end portion 30 includes a first outer-link opening 30A. The first outer-link opening 30A has the first outer-link center axis CA1. In this embodiment, the axial direction D1 is parallel to the first outer-link center axis CA1. However, the axial direction D1 can be non-parallel to the first outer-link center axis CA1. As seen in FIG. 2, the first link pin 22 is provided in the first outer-link opening 30A.

Figure 6:
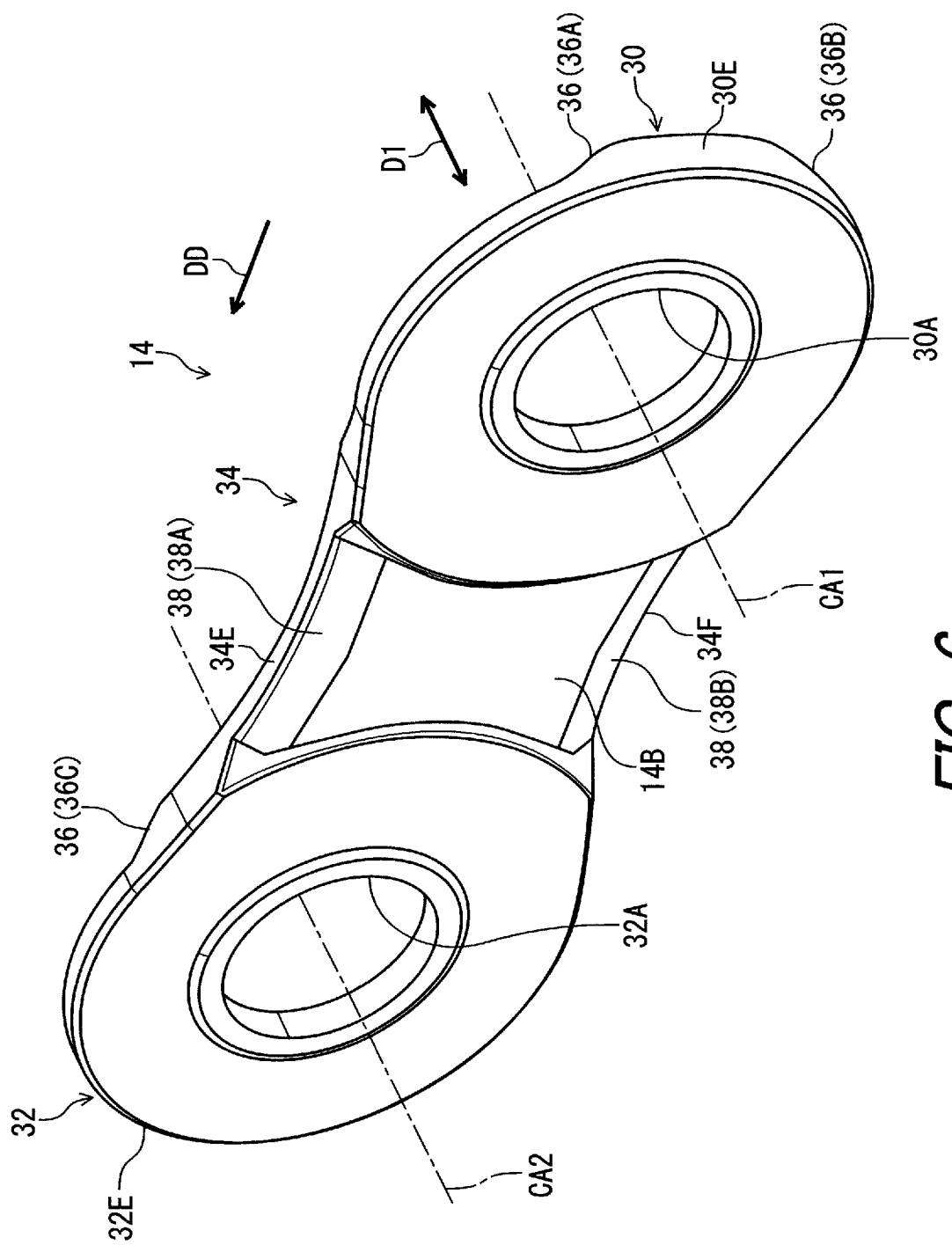
FIG. 6 is another perspective view of the first outer link plate of the bicycle chain illustrated in FIG. 1.

As seen in FIG. 6, the second outer-link end portion 32 includes a second outer-link center axis CA2 and a second outer-link outermost edge 32E. The second outer-link outermost edge 32E is provided radially outward of the second outer-link center axis CA2. In this embodiment, the second outer-link end portion 32 includes a second outer-link opening 32A. The second outer-link opening 32A has the second outer-link center axis CA2. The second outer-link center axis CA2 is spaced apart from the first outer-link center axis CA1. The second outer-link center axis CA2 is parallel to the first outer-link center axis CA1. However, the second outer-link center axis CA2 can be non-parallel to the first outer-link center axis CA1. As seen in FIG. 2, the second link pin 24 is provided in the second outer-link opening 32A.

As seen in FIGS. 5 and 6, the first outer-link intermediate portion 34 includes a pair of first outer-link intermediate edges 34E and 34F. The pair of first outer-link intermediate edges 34E and 34F is provided between the first outer-link outermost edge 30E and the second outer-link outermost edge 32E.

Figure 7:
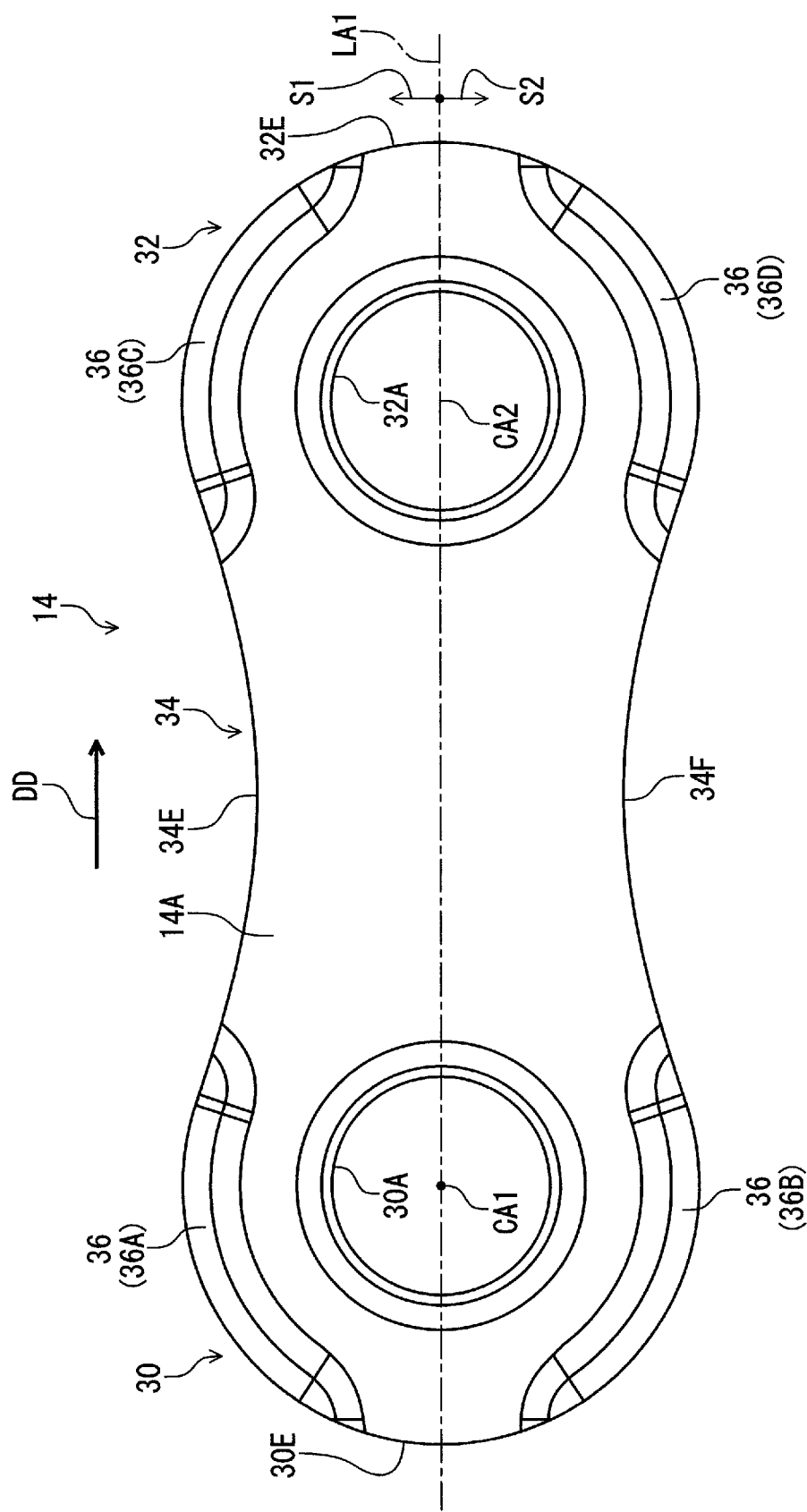
FIG. 7 is a side elevational view of the first outer link plate of the bicycle chain illustrated in FIG. 1.

As seen in FIG. 7, the first outer link plate 14 comprises at least one first chamfer 36. The at least one first chamfer 36 is provided on the first outer surface 14A. In this embodiment, the at least one first chamfer 36 includes a plurality of first chamfers 36A, 36B, 36C, and 36D provided on the first outer surface 14A. However, a total number of the first chamfers 36 is not limited to this embodiment.

The first chamfer 36A extends along the first outer-link outermost edge 30E. The first chamfer 36B extends along the first outer-link outermost edge 30E. The first chamfer 36C extends along the second outer-link outermost edge 32E. The first chamfer 36D extends along the second outer-link outermost edge 32E. The first chamfers 36A and 36B are provided between the first outer-link outermost edge 30E and the first outer-link center axis CA1. The first chamfers 36C and 36D are provided between the second outer-link outermost edge 32E and the second outer-link center axis CA2.

The first outer link plate 14 comprises a first outer-link longitudinal axis LA1. The first outer-link longitudinal axis LA1 is defined when viewed in the axial direction D1. The first outer-link longitudinal axis LA1 extends through the first outer-link center axis CA1 and the second outer-link center axis CA2 to divide the first outer surface 14A into a first side S1 and a second side S2 when viewed in the axial direction D1. The at least one first chamfer 36 is provided on the first side S1 and the second side S2. In this embodiment, the first chamfers 36A and 36C are provided on the first side S1. The first chamfers 36B and 36D are provided on the second side S2.

The first outer-link longitudinal axis LA1 is provided between one chamfer of the plurality of first chamfers 36 and another chamfer of the plurality of first chamfers 36 when viewed in the axial direction D1. In this embodiment, the first outer-link longitudinal axis LA1 is provided between one of the first chamfers 36A and 36C and one of the first chamfers 36B and 36D when viewed in the axial direction D1. However, the positional relationship among the first outer-link longitudinal axis LA1 and the plurality of first chamfers 36A to 36D is not limited to this embodiment. At least one of the first chamfers 36A to 36D can be provided on the first outer-link longitudinal axis LA1 when viewed in the axial direction D1.

Figure 8:
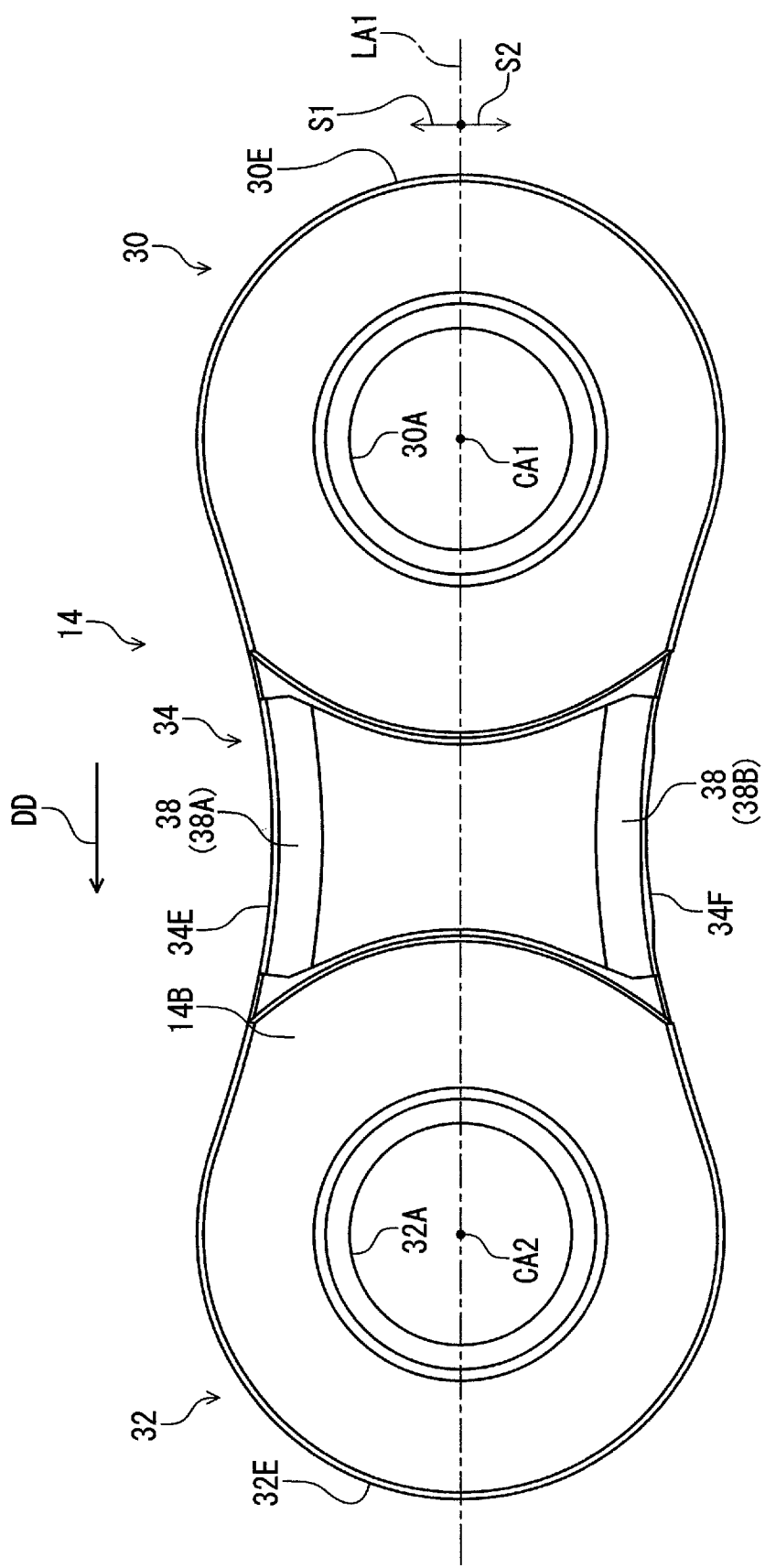
FIG. 8 is another side elevational view of the first outer link plate of the bicycle chain illustrated in FIG. 1.

As seen in FIG. 8, the first outer link plate 14 comprises at least one first additional chamfer 38. The at least one first additional chamfer 38 is provided on the first inner surface 14B. In this embodiment, the at least one first additional chamfer 38 includes a plurality of first additional chamfers 38A and 38B provided on the first inner surface 14B. However, a total number of the first additional chamfers 38 is not limited to this embodiment.

The first additional chamfer 38A extends along the first outer-link intermediate edge 34E. The first additional chamfer 38B extends along the first outer-link intermediate edge 34F. The at least one first additional chamfer 38 is provided on the first side S1 and the second side S2. In this embodiment, the first additional chamfer 38A is provided on the first side S1. The first additional chamfer 38B is provided on the second side S2.

The first outer-link longitudinal axis LA1 is provided between one chamfer of the plurality of first additional chamfers 38 and another chamfer of the plurality of first additional chamfers 38 when viewed in the axial direction D1. In this embodiment, the first outer-link longitudinal axis LA1 is provided between the first additional chamfers 38A and 38B when viewed in the axial direction D1. However, the positional relationship among the first outer-link longitudinal axis LA1 and the plurality of first additional chamfers 38A and 38B is not limited to this embodiment. At least one of the first additional chamfers 38A and 38B can be provided on the first outer-link longitudinal axis LA1 when viewed in the axial direction D1.

Figure 9:
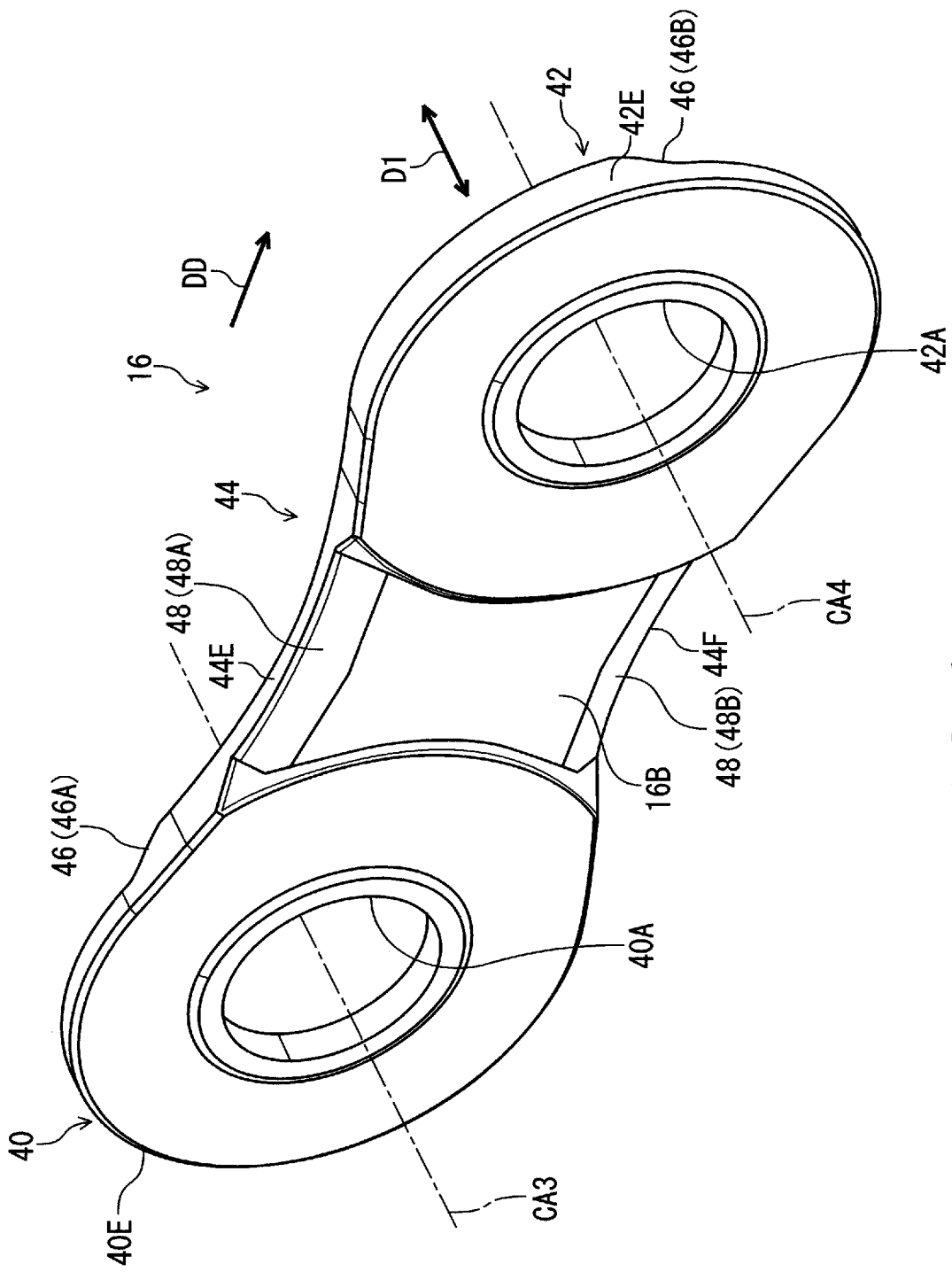
FIG. 9 is a perspective view of a second outer link plate of the bicycle chain illustrated in FIG. 1.

As seen in FIG. 9, the second outer link plate 16 comprises a third outer-link end portion 40 and a fourth outer-link end portion 42. The second outer link plate 16 comprises a second outer-link intermediate portion 44 provided between the third outer-link end portion 40 and the fourth outer-link end portion 42. The second outer-link intermediate portion 44 interconnects the third outer-link end portion 40 and the fourth outer-link end portion 42.

The third outer-link end portion 40 includes a third outer-link center axis CA3 and a third outer-link outermost edge 40E. The third outer-link outermost edge 40E is provided radially outward of the third outer-link center axis CA3. In this embodiment, the third outer-link end portion 40 includes a third outer-link opening 40A. The third outer-link opening 40A has the third outer-link center axis CA3.

As seen in FIG. 3, the first link pin 22 is provided in the third outer-link opening 40A. The third outer-link center axis CA3 corresponds to the first outer-link center axis CA1. The first outer-link center axis CA1 extends through the third outer-link opening 40A. As seen in FIG. 2, the third outer-link center axis CA3 extends through the first outer-link opening 30A.

Figure 10:
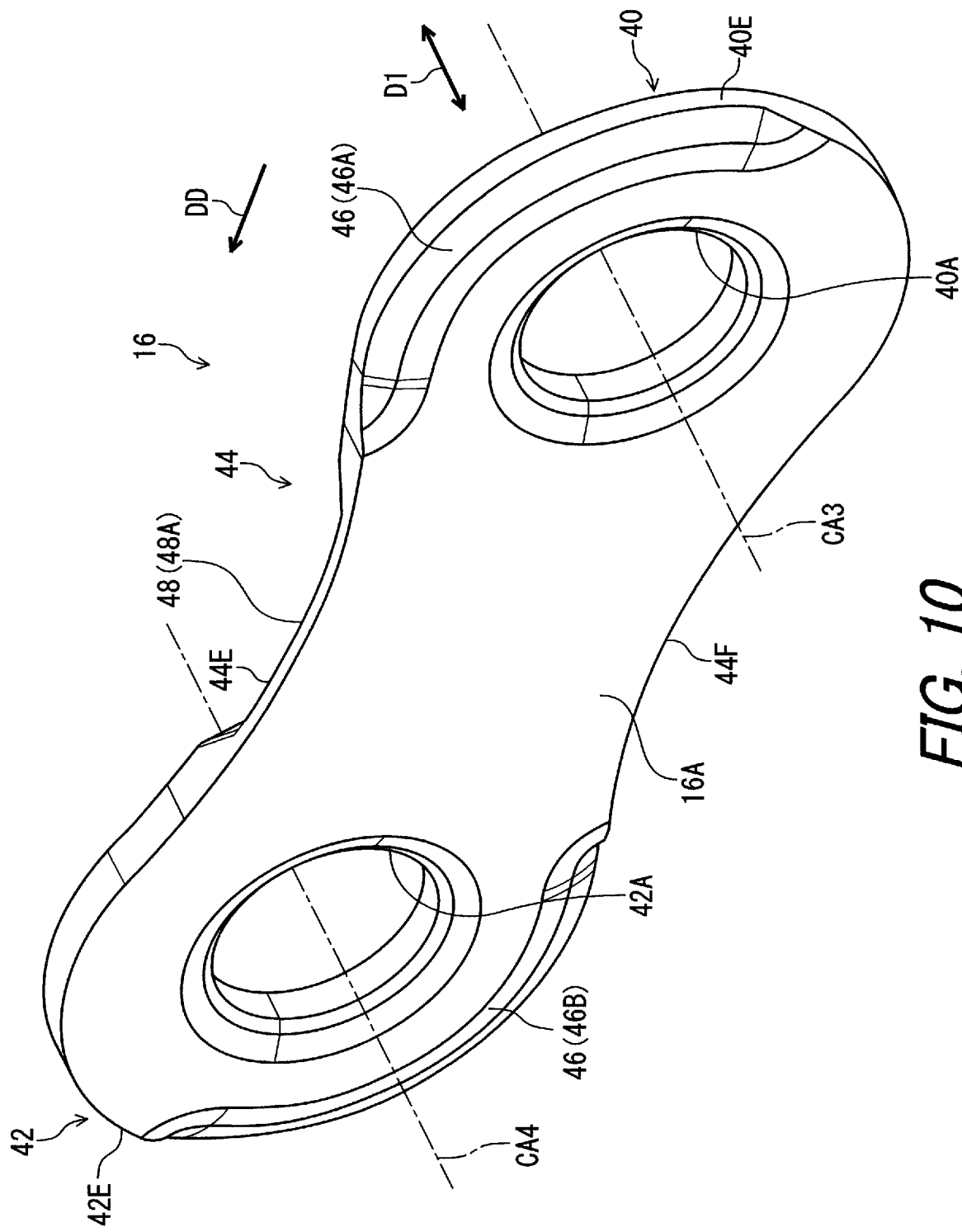
FIG. 10 is another perspective view of the second outer link plate of the bicycle chain illustrated in FIG. 1.

As seen in FIG. 10, the fourth outer-link end portion 42 includes a fourth outer-link center axis CA4 and a fourth outer-link outermost edge 42E. The fourth outer-link outermost edge 42E is provided radially outward of the fourth outer-link center axis CA4. In this embodiment, the fourth outer-link end portion 42 includes a fourth outer-link opening 42A. The fourth outer-link opening 42A has the fourth outer-link center axis CA4. The fourth outer-link center axis CA4 is spaced apart from the third outer-link center axis CA3. The fourth outer-link center axis CA4 is parallel to the third outer-link center axis CA3. However, the fourth outer-link center axis CA4 can be non-parallel to the third outer-link center axis CA3.

As seen in FIG. 3, the second link pin 24 is provided in the fourth outer-link opening 42A. The fourth outer-link center axis CA4 corresponds to the second outer-link center axis CA2. The second outer-link center axis CA2 extends through the fourth outer-link opening 42A. As seen in FIG. 2, the fourth outer-link center axis CA4 extends through the second outer-link opening 32A.

As seen in FIGS. 9 and 10, the second outer-link intermediate portion 44 includes a pair of second outer-link intermediate edges 44E and 44F. The pair of second outer-link intermediate edges 44E and 44F is provided between the third outer-link outermost edge 40E and the fourth outer-link outermost edge 42E.

Figure 11:
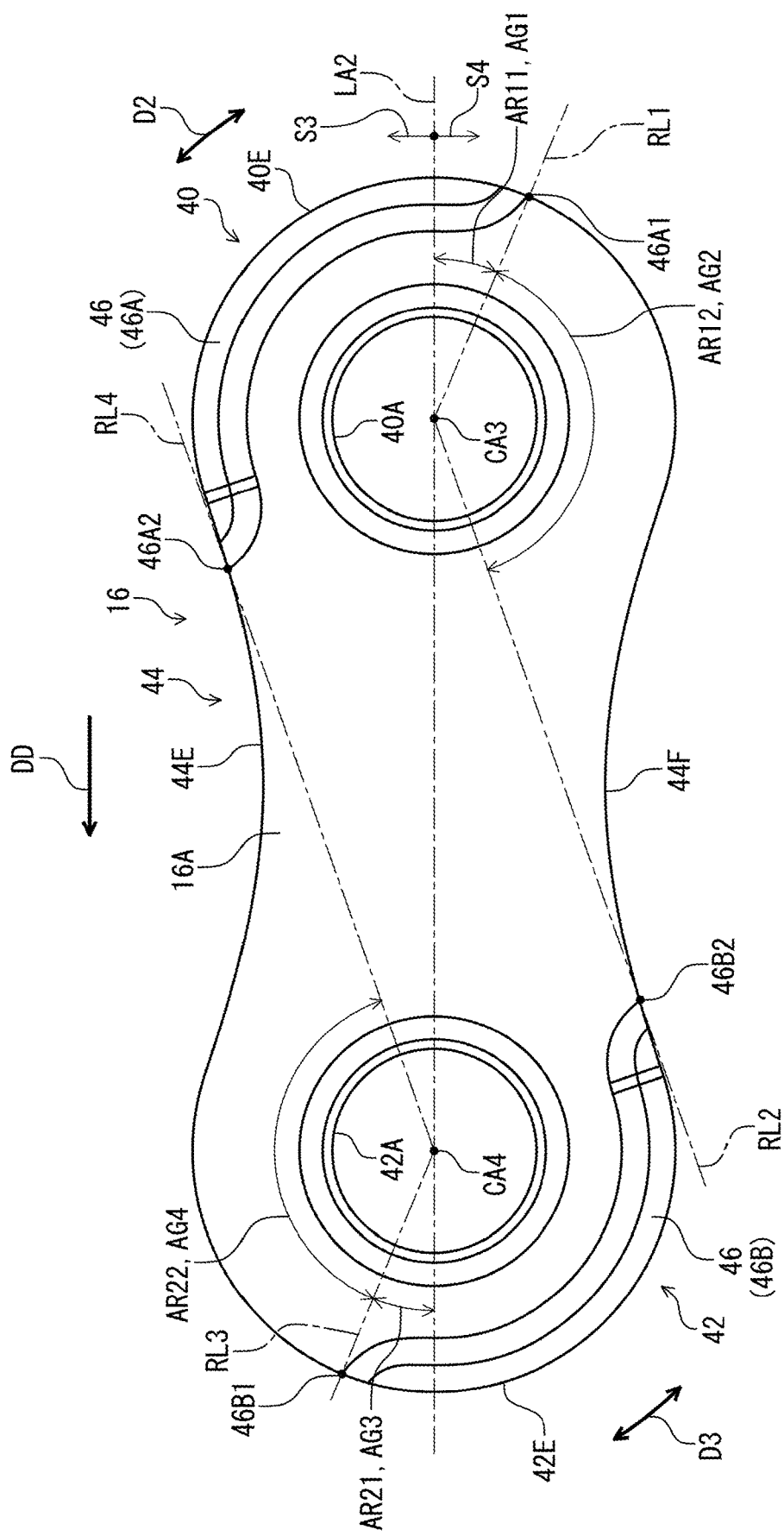
FIG. 11 is a side elevational view of the second outer link plate of the bicycle chain illustrated in FIG. 1.

As seen in FIG. 11, the second outer link plate 16 comprises at least one second chamfer 46. The at least one second chamfer 46 is provided on the second outer surface 16A. In this embodiment, the at least one second chamfer 46 includes a plurality of second chamfers 46A and 46B provided on the second outer surface 16A. However, a total number of the second chamfers 46 is not limited to this embodiment.

The second chamfer 46A extends along the third outer-link outermost edge 40E. The second chamfer 46B extends along the fourth outer-link outermost edge 42E. The second chamfer 46A is provided between the third outer-link outermost edge 40E and the third outer-link center axis CA3. The second chamfer 46B is provided between the fourth outer-link outermost edge 42E and the fourth outer-link center axis CA4.

The second chamfer 46A includes circumferential ends 46A1 and 46A2. The second chamfer 46A extends between the circumferential ends 46A1 and 46A2. The second chamfer 46B includes circumferential ends 46B1 and 46B2. The second chamfer 46B extends between the circumferential ends 46B1 and 46B2.

The second outer link plate 16 comprises a second outer-link longitudinal axis LA2. The second outer-link longitudinal axis LA2 is defined when viewed in the axial direction D1. The second outer-link longitudinal axis LA2 extends through the third outer-link center axis CA3 and the fourth outer-link center axis CA4 to divide the second outer surface 16A into a third side S3 and a fourth side S4 when viewed in the axial direction D1. The at least one second chamfer 46 is provided on the third side S3. In this embodiment, the second chamfers 46A and 46B are provided on the third side S3.

In this embodiment, the at least one second chamfer 46 is provided on the second outer-link longitudinal axis LA2 when viewed in the axial direction D1. The plurality of second chamfers 46A and 46B is provided on the second outer-link longitudinal axis LA2 when viewed in the axial direction D1. However, at least one of the second chamfers 46A and 46B can be provided not to overlap with the second outer-link longitudinal axis LA2 when viewed in the axial direction D1.

The circumferential end 46A2 of the second chamfer 46A is provided on the third side S3. The circumferential end 46A1 of the second chamfer 46A is provided on the fourth side S4. The second chamfer 46A extends from the circumferential end 46A1 to the circumferential end 46A2 through the second outer-link longitudinal axis LA2 when viewed in the axial direction D1.

The circumferential end 46B1 of the second chamfer 46B is provided on the third side S3. The circumferential end 46B2 of the second chamfer 46B is provided on the fourth side S4. The second chamfer 46B extends from the circumferential end 46B1 to the circumferential end 46B2 through the second outer-link longitudinal axis LA2 when viewed in the axial direction D1.

The fourth side S4 includes a first circumferential area AR11. The first circumferential area AR11 is defined between the second outer-link longitudinal axis LA2 and a first radial reference line RL1. The first radial reference line RL1 radially extends from the third outer-link center axis CA3 through a circumferential end of the at least one second chamfer 46. The first radial reference line RL1 radially extends from the third outer-link center axis CA3 through the circumferential end 46A1 of the second chamfer 46A. The at least one second chamfer 46 is positioned in the first circumferential area AR11. The second chamfer 46A is positioned in the first circumferential area AR11.

The first circumferential area AR11 has a first angle AG1 defined about the third outer-link center axis CA3. The first angle AG1 is equal to or larger than 20 degrees. In this embodiment, the first angle AG1 is 20 degrees. However, the first angle AG1 is not limited to this embodiment.

The fourth side S4 includes a first chamfer free area AR12. The first chamfer free area AR12 is adjacent to the first circumferential area AR11. The first circumferential area AR11 is provided between the second outer-link longitudinal axis LA2 and the first chamfer free area AR12. The first chamfer free area AR12 is defined between the first radial reference line RL1 and a second radial reference line RL2 radially extending from the third outer-link center axis CA3. The first radial reference line RL1 is positioned between the second outer-link longitudinal axis LA2 and the second radial reference line RL2 in a circumferential direction D2 with respect to the third outer-link center axis CA3. In this embodiment, the second radial reference line RL2 extends from the third outer-link center axis CA3 through the circumferential end 46B2 of the second chamfer 46B.

In this embodiment, the at least one second chamfer 46 is provided outside the first chamfer free area AR12. The second chamfer 46A is provided outside the first chamfer free area AR12. The second chamfer 46B is provided outside the first chamfer free area AR12.

The first chamfer free area AR12 has a second angle AG2 defined about the third outer-link center axis CA3. The second angle AG2 is equal to or larger than 53 degrees. However, the second angle AG2 is not limited to the above range.

The third side S3 includes a second circumferential area AR21. The second circumferential area AR21 is defined between the second outer-link longitudinal axis LA2 and a third radial reference line RL3. The third radial reference line RL3 radially extends from the fourth outer-link center axis CA4 through a circumferential end of the at least one second chamfer 46. The third radial reference line RL3 radially extends from the fourth outer-link center axis CA4 through the circumferential end 46B1 of the second chamfer 46B. The at least one second chamfer 46 is positioned in the second circumferential area AR21. The second chamfer 46B is positioned in the second circumferential area AR21.

The second circumferential area AR21 has a third angle AG3 defined about the fourth outer-link center axis CA4. The third angle AG3 is equal to or larger than 20 degrees. In this embodiment, the third angle AG3 is 20 degrees. However, the third angle AG3 is not limited to this embodiment and the above range.

The third side S3 includes a second chamfer free area AR22. The second chamfer free area AR22 is adjacent to the second circumferential area AR21. The second circumferential area AR21 is provided between the second outer-link longitudinal axis LA2 and the second chamfer free area AR22. The second chamfer free area AR22 is defined between the third radial reference line RL3 and a fourth radial reference line RL4 radially extending from the fourth outer-link center axis CA4. The third radial reference line RL3 is positioned between the second outer-link longitudinal axis LA2 and the fourth radial reference line RL4 in a circumferential direction D3 with respect to the fourth outer-link center axis CA4. In this embodiment, the fourth radial reference line RL4 extends from the fourth outer-link center axis CA4 through the circumferential end 46A2 of the second chamfer 46A.

In this embodiment, the at least one second chamfer 46 is provided outside the second chamfer free area AR22. The second chamfer 46A is provided outside the second chamfer free area AR22. The second chamfer 46B is provided outside the second chamfer free area AR22.

The second chamfer free area AR22 has a fourth angle AG4 defined about the fourth outer-link center axis CA4. The fourth angle AG4 is equal to or larger than 53 degrees. However, the fourth angle AG4 is not limited to the above range.

Figure 12:
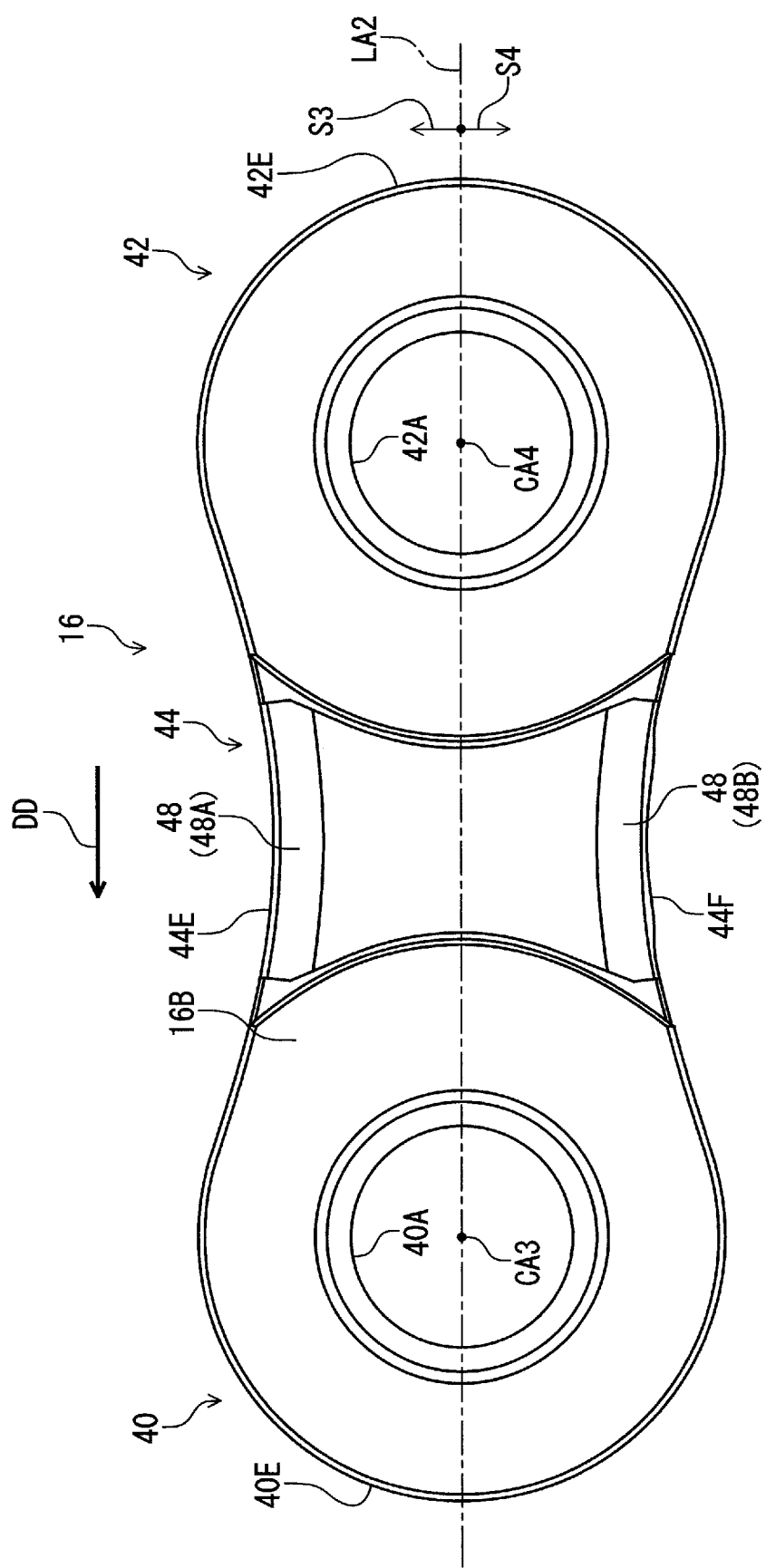
FIG. 12 is another side elevational view of the second outer link plate of the bicycle chain illustrated in FIG. 1.

As seen in FIG. 12, the second outer link plate 16 comprises at least one second additional chamfer 48. The at least one second additional chamfer 48 is provided on the second inner surface 16B. In this embodiment, the at least one second additional chamfer 48 includes a plurality of second additional chamfers 48A and 48B provided on the second inner surface 16B. However, a total number of the second additional chamfers 48 is not limited to this embodiment.

The second additional chamfer 48A extends along the second outer-link intermediate edge 44E. The second additional chamfer 48B extends along the second outer-link intermediate edge 44F. The at least one second additional chamfer 48 is provided on the third side S3 and the fourth side S4. In this embodiment, the second additional chamfer 48A is provided on the third side S3. The second additional chamfer 48B is provided on the fourth side S4.

The second outer-link longitudinal axis LA2 is provided between one chamfer of the plurality of second additional chamfers 48 and another chamfer of the plurality of second additional chamfers 48 when viewed in the axial direction D1. In this embodiment, the second outer-link longitudinal axis LA2 is provided between the second additional chamfers 48A and 48B when viewed in the axial direction D1. However, the positional relationship among the second outer-link longitudinal axis LA2 and the plurality of second additional chamfers 48A and 48B is not limited to this embodiment. At least one of the second additional chamfers 48A and 48B can be provided on the second outer-link longitudinal axis LA2 when viewed in the axial direction D1.

As seen in FIGS. 7 and 11, the total number of the at least one second chamfer 46 is different from a total number of the at least one first chamfer 36. The total number of the plurality of second chamfers 46A and 46B is different from the total number of the plurality of first chamfers 36A, 36B, 36C, and 36D. In this embodiment, the total number of the at least one second chamfer 46 is smaller than the total number of the at least one first chamfer 36. The total number of the plurality of second chamfers 46A and 46B is smaller than the total number of the plurality of first chamfers 36A, 36B, 36C, and 36D. However, the total number of the plurality of second chamfers 46 can be larger than the total number of the plurality of first chamfers 36.

In this embodiment, the total number of the at least one second chamfer 46 is a divisor of the total number of the at least one first chamfer 36. At least one of the total number of the at least one first chamfer 36 and the total number of the at least one second chamfer 46 is a multiple of two. In this embodiment, the total number of the first chamfers 36 is four. The total number of the second chamfers 46 is two. The total number of the first chamfers 36 is a multiple of two. The total number of the second chamfer 46 is two. However, the total number of the at least one second chamfer 46 is not limited to be a divisor of the total number of the at least one first chamfer 36. The total number of the first chamfers 36 is not limited to be a multiple of two. The total number of the second chamfers 46 is not limited to a multiple of two.

Figure 13:
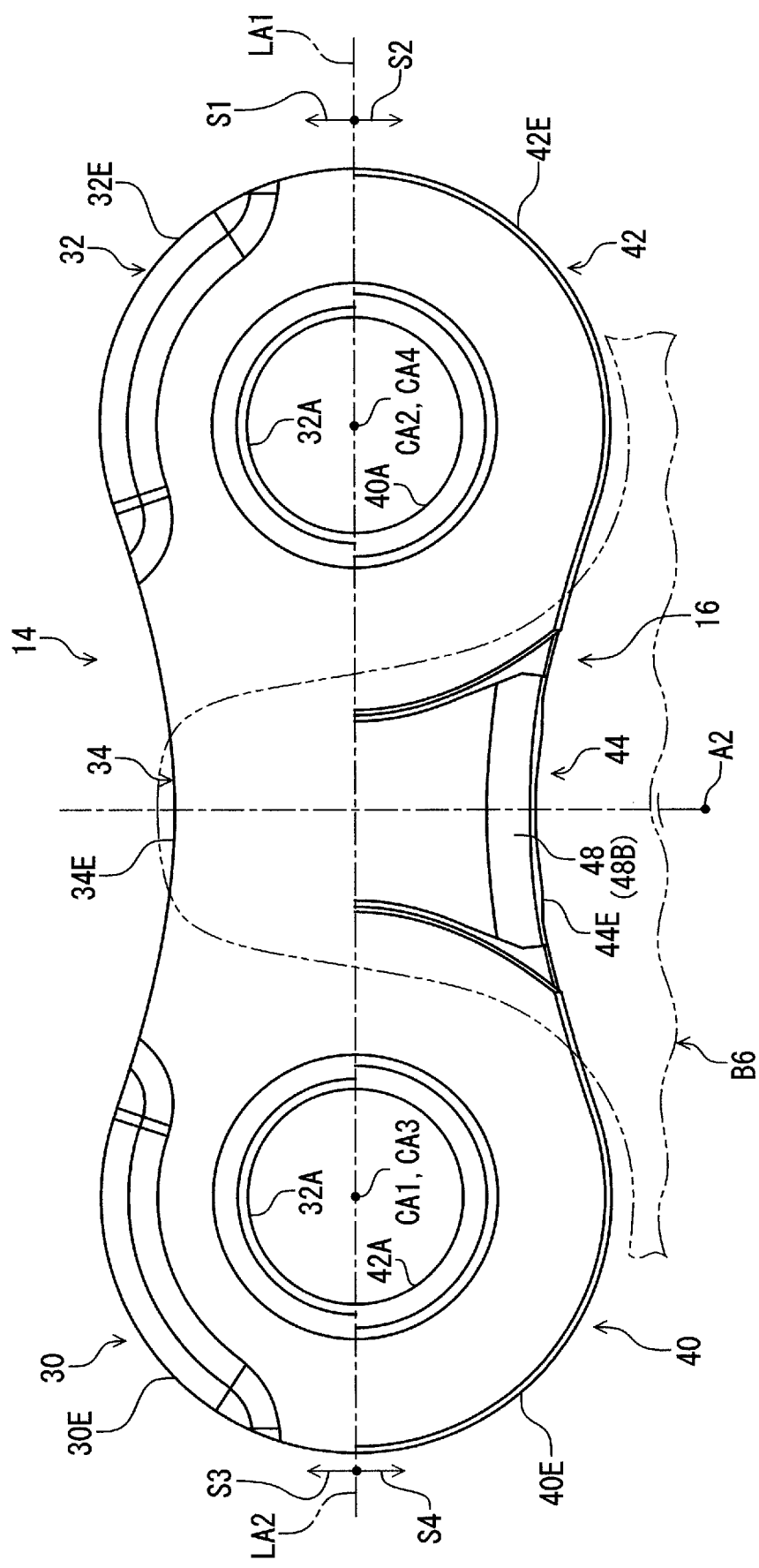
FIG. 13 is a side elevational view of the first outer link plate (upper half) and the second outer link plate (lower half) of the bicycle chain illustrated in FIG. 1, with a bicycle sprocket engaged with the bicycle chain.

As seen in FIG. 13, the first side S1 is overlapped with the third side S3 when viewed in the axial direction D1. The second side S2 is overlapped with the fourth side S4 when viewed in the axial direction D1. However, the first side S1 can be overlapped with the fourth side S4 when viewed in the axial direction D1. The second side S2 can be overlapped with the third side S3 when viewed in the axial direction D1.

The second side S2 is positioned radially closer to the rotational center axis A2 of the bicycle sprocket B6 of the bicycle 10 than the first side S1 in the state where the bicycle chain 12 is engaged with the bicycle sprocket B6. However, the first side S1 can be positioned radially closer to the rotational center axis A2 of the bicycle sprocket B6 of the bicycle 10 than the second side S2 in the state where the bicycle chain 12 is engaged with the bicycle sprocket B6.

The fourth side S4 is positioned radially closer to the rotational center axis A2 of the bicycle sprocket B6 of the bicycle 10 than the third side S3 in the state where the bicycle chain 12 is engaged with the bicycle sprocket B6. However, the third side S3 can be positioned radially closer to the rotational center axis A2 of the bicycle sprocket B6 of the bicycle 10 than the fourth side S4 in the state where the bicycle chain 12 is engaged with the bicycle sprocket B6.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain comprising:
   a first outer link plate comprising:
   a first outer surface;
   a first inner surface provided on a reverse side of the first outer surface in an axial direction;
   a first outer-link end portion including:
      a first outer-link center axis; and
      a first outer-link outermost edge provided radially outward of the first outer-link center axis;
   a second outer-link end portion including:
      a second outer-link center axis; and
      a second outer-link outermost edge provided radially outward of the second outer-link center axis;
   at least one first chamfer provided on the first outer surface; and
   a first outer-link longitudinal axis extending through the first outer-link center axis and the second outer-link center axis to divide the first outer surface into a first side and a second side when viewed in the axial direction, a first-first chamfer of the at least one first chamfer being provided on the first side and a second-first chamfer being provided on the second side, the first-first chamfer not overlapping the first outer-link longitudinal axis;
   a second outer link plate comprising:
   a second outer surface;
   a second inner surface provided on a reverse side of the second outer surface in the axial direction, the second inner surface facing toward the first inner surface in the axial direction;
   a third outer-link end portion including:
      a third outer-link center axis corresponding to the first outer-link center axis;
      a third outer-link outermost edge provided radially outward of the third outer-link center axis; and
   a fourth outer-link end portion including:
      a fourth outer-link center axis corresponding to the second outer-link center axis; and
      a fourth outer-link outermost edge provided radially outward of the fourth outer-link center axis;
   at least one second chamfer provided on the second outer surface; and
   a second outer-link longitudinal axis extending through the third outer-link center axis and the fourth outer-link center axis to divide the second outer surface into a third side and a fourth side when viewed in the axial direction, the at least one second chamfer being provided on the third side, the fourth side including:
a first circumferential area defined between the second outer-link longitudinal axis and a first radial reference line radially extending from the third outer-link center axis through a circumferential end of the at least one second chamfer, the first circumferential area having a first angle defined about the third outer-link center axis, the first angle being equal to or larger than 20 degrees; and
a first chamfer free area adjacent to the first circumferential area, the at least one second chamfer being provided outside the first chamfer free area, the first circumferential area being provided between the second outer-link longitudinal axis and the first chamfer free area.

2. The bicycle chain according to claim 1, wherein the at least one second chamfer is positioned in the first circumferential area.

3. The bicycle chain according to claim 1, wherein the first chamfer free area is defined between the first radial reference line and a second radial reference line radially extending from the third outer-link center axis, the first chamfer free area has a second angle defined about the third outer-link center axis, and the first radial reference line is positioned between the second outer-link longitudinal axis and the second radial reference line in a circumferential direction with respect to the third outer-link center axis.

4. The bicycle chain according to claim 1, wherein the first side is overlapped with the third side when viewed in the axial direction, and the second side is overlapped with the fourth side when viewed in the axial direction.

5. The bicycle chain according to claim 1, wherein the second outer link plate is positioned closer to a bicycle frame of a bicycle than the first outer link plate in a state where the bicycle chain is assembled to the bicycle.

6. The bicycle chain according to claim 1, wherein the fourth side is positioned radially closer to a rotational center axis of a bicycle sprocket of a bicycle than the third side in a state where the bicycle chain is engaged with the bicycle sprocket.

7. A bicycle chain comprising:
a first outer link plate comprising:
a first outer surface;
a first inner surface provided on a reverse side of the first outer surface in an axial direction;
a first outer-link end portion including:
a first outer-link center axis; and
a first outer-link outermost edge provided radially outward of the first outer-link center axis;
a second outer-link end portion including:
a second outer-link center axis; and
a second outer-link outermost edge provided radially outward of the second outer-link center axis;
at least one first chamfer provided on the first outer surface; and
a first outer-link longitudinal axis extending through the first outer-link center axis and the second outer-link center axis to divide the first outer surface into a first side and a second side when viewed in the axial direction, the at least one first chamfer being provided on the first side and the second side;
a second outer link plate comprising:
a second outer surface;
a second inner surface provided on a reverse side of the second outer surface in the axial direction, the second inner surface facing toward the first inner surface in the axial direction;
a third outer-link end portion including:
a third outer-link center axis corresponding to the first outer-link center axis;
a third outer-link outermost edge provided radially outward of the third outer-link center axis; and
a fourth outer-link end portion including:
a fourth outer-link center axis corresponding to the second outer-link center axis; and
a fourth outer-link outermost edge provided radially outward of the fourth outer-link center axis;
at least one second chamfer provided on the second outer surface; and
a second outer-link longitudinal axis extending through the third outer-link center axis and the fourth outer-link center axis to divide the second outer surface into a third side and a fourth side when viewed in the axial direction, the at least one second chamfer being provided on the third side,
the fourth side including:
a first circumferential area defined between the second outer-link longitudinal axis and a first radial reference line radially extending from the third outer-link center axis through a circumferential end of the at least one second chamfer, the first circumferential area having a first angle defined about the third outer-link center axis, the first angle being equal to or larger than 20 degrees; and
a first chamfer free area adjacent to the first circumferential area, the at least one second chamfer being provided outside the first chamfer free area, the first circumferential area being provided between the second outer-link longitudinal axis and the first chamfer free area, wherein
the first chamfer free area is defined between the first radial reference line and a second radial reference line radially extending from the third outer-link center axis,
the first chamfer free area has a second angle defined about the third outer-link center axis,
the first radial reference line is positioned between the second outer-link longitudinal axis and the second radial reference line in a circumferential direction with respect to the third outer-link center axis, and
the second angle is equal to or larger than 53 degrees.

8. A bicycle chain comprising:
a first outer link plate comprising:
a first outer surface;
a first inner surface provided on a reverse side of the first outer surface in an axial direction; and
at least one first chamfer provided on a first outer peripheral edge of the first outer surface; and
a second outer link plate comprising:
a second outer surface;
a second inner surface provided on a reverse side of the second outer surface in the axial direction, the second inner surface facing toward the first inner surface in the axial direction; and
at least one second chamfer provided on a second outer peripheral edge of the second outer surface, a total number of the at least one second chamfer being different from a total number of the at least one first chamfer.

9. The bicycle chain according to claim 8, wherein the total number of the at least one second chamfer is smaller than the total number of the at least one first chamfer.

10. The bicycle chain according to claim 8, wherein the total number of the at least one second chamfer is a divisor of the total number of the at least one first chamfer.

11. The bicycle chain according to claim 8, wherein at least one of the total number of the at least one first chamfer and the total number of the at least one second chamfer is a multiple of two.

12. The bicycle chain according to claim 8, wherein the at least one first chamfer includes a plurality of first chamfers provided on the first outer surface, the at least one second chamfer includes a plurality of second chamfers provided on the second outer surface, and a total number of the plurality of second chamfers is smaller than a total number of the plurality of first chamfers.

13. The bicycle chain according to claim 12, wherein the second outer link plate comprises a second outer-link longitudinal axis defined when viewed in the axial direction, and the at least one second chamfer is provided on the second outer-link longitudinal axis when viewed in the axial direction.

14. The bicycle chain according to claim 12, wherein the first outer link plate comprises a first outer-link longitudinal axis defined when viewed in the axial direction, the at least one first chamfer includes a plurality of first chamfers provided on the first outer surface, and the first outer-link longitudinal axis is provided between one chamfer of the plurality of first chamfers and another chamfer of the plurality of first chamfers when viewed in the axial direction.

* * * * *